Aug. 19, 1952  H. M. DODGE  2,607,091
DOOR SEALING DEVICE
Filed Aug. 20, 1949

INVENTOR
Howard M. Dodge
BY Evans & McCoy
ATTORNEYS

Patented Aug. 19, 1952

2,607,091

UNITED STATES PATENT OFFICE 2,607,091

DOOR SEALING DEVICE

Howard M. Dodge, Wabash, Ind., assignor to The General Tire and Rubber Company, Akron, Ohio, a corporation of Ohio Application August 20, 1949, Serial No. 111,376

9 Claims. (Cl. 20—69)

This invention relates to door sealing devices for refrigerator doors or the like and particularly to a sealing device employing an elastic rubber sealing strip which is uniform in cross section and which may be formed by extrusion.

In applying such sealing strips to doors of the character referred to, difficulty has been experienced in providing a seal that is effective at the corner portions of the door where angularly disposed portions of the sealing strip are joined. In door seals where mitered joints have been employed, the seal has been seriously impaired at the corners unless an integral corner joint is formed by means of a vulcanizing operation. Such a vulcanizing operation not only adds considerably to the cost of the seal, but necessitates the making of rectangular seals to fit every size of door at the factory, which adds materially to the cost of handling and shipping.

The present invention has for its object to provide a filler strip which is so formed that it may be notched to permit it to be bent to a small radius of curvature at door corners without materially impairing the seal at such corners.

A further object of the invention is to provide a sealing strip which is inexpensive, which is relatively lightweight, which can be shipped in strip form, and which can be quickly and easily applied to a door of any size.

With the above and other objects in view, the invention may be said to comprise the sealing devices illustrated in the accompanying drawings and hereinafter described together with such variations and modifications thereof as will be apparent to one skilled in the art to which the invention pertains.

Reference should be had to the accompanying drawings forming part of this specification in which.

Figure 1:
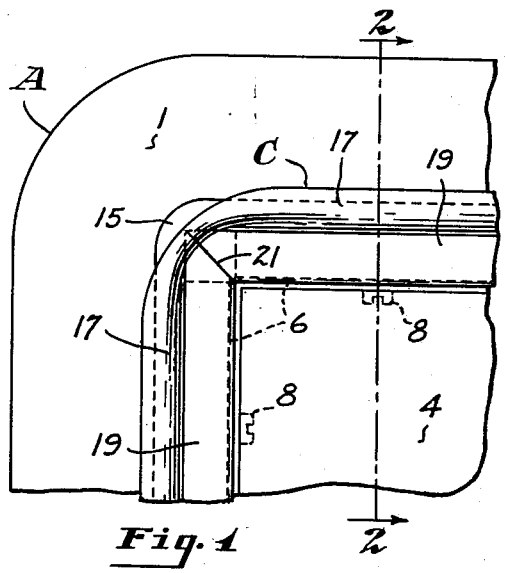
Figure 1 is a fragmentary elevation showing the corner portion of a refrigerator door to which the sealing device of the present invention has been applied.
Figure 2:
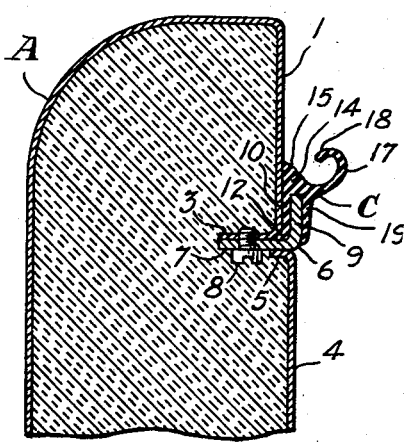
Fig. 2 is a vertical section taken on the line indicated at 2—2 in Fig. 1.

In the accompanying drawings the sealing device of the present invention is shown applied to a refrigerator door, the door being indicated by the reference character A, the body of the refrigerator to which the door is applied by the reference character B, and the sealing strip by the reference character C. The sealing strip C is applied to a marginal portion 1 of the inner face of the door A and engages with a flat face 2 on the body B of the refrigerator adjacent the door opening. The marginal inner face portion 1 of the door is provided with an inturned flange 3 and the central portion of the inner face of the door is formed by panel 4 which has an inturned flange 5 spaced inwardly from the flange 3. A retaining structure 6 has a flange 7 received between the flanges 3 and 5. The flange 7 is attached to the flange 3 by suitable means such as screws 8.

The retaining structure 6 is spaced inwardly from the marginal edge of the door A and has a shape corresponding to that of the door, portions of the structure extending parallel to the side and end edges of the door and the structure having a retaining flange 9 which extends outwardly from the flange 7 parallel with the face portion 1 of the door. The flange 9 extends along the sides and around the corners of the retaining structure or frame. If desired, the structure 6 may be formed of straight angle bars mitered to abut at the corners and provide a continuous flat retaining flange.

The sealing strip C has a base flange 10 which is clamped between the retaining flange 9 and the marginal face portion 1 of the door. The sealing strip has a seating face 11 which is formed in part by the exterior face of the flange 10. The flange 10 may be provided with a bead 12 at its free edge which seats in a recess 13 at the inner edge of the face portion 1 of the door. The seating face 11 extends outwardly beyond the outer edge of the retaining flange 9 and forms the base of a cushioning flange 14 which is relatively thick adjacent its base and tapers from the base. The cushioning flange 14 has an outer receding inclined face 15 and an inner face portion 16 which is substantially perpendicular to the base flange 10. The outer portion of the cushioning flange 14 is curved outwardly from the inclined face 15 and inwardly toward said face to provide the striker bead 17 which has a free edge 18 that is collapsible into engagement with the inclined face 15 when the sealing strip is pressed against the face 2 of the refrigerator body, the striker bead 17 being disposed outwardly of the outer edge of the sealing strip 9 so that when it is subjected to pressure, it will be collapsed inwardly against the inclined outer face 15 of the strip.

Figure 5:
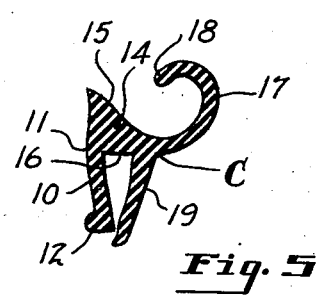
Fig. 5 is a section taken on the line indicated at 5—5 of Fig. 4, showing the cross-sectional shape of the sealing strip.

In order to brace the cushioning portion of the sealing strip, and to more effectively confine the collapsing movement of the striker bead exteriorly of the retaining flange, a bracing flange 19 extends inwardly from the cushioning flange 14 and bears against the outer face of the retaining flange 9. In order to provide more effective bracing action and to insure tight engagement with the retaining flange 9, the bracing flange 19 and base flange 10 are preferably so formed that they normally converge toward their free edges, as shown in Fig. 5.

In applying the sealing strip to a door, the miter notches 20 and 21 are cut in the flanges 10 and 19, the apices of these notches terminating adjacent the cushioning flange 14. The two notches 20 and 21 are superimposed in alignment with one another and have an angularity such that the opposite edges of the notches abut when the strip is bent around the corner portion of the retaining structure 6, as shown in Fig. 1.

Figure 3:
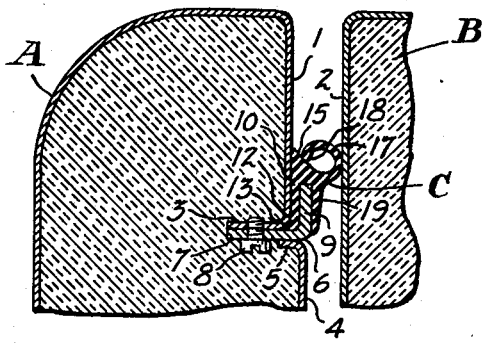
Fig. 3 is a fragmentary sectional view showing the sealing strip compressed between the door and the body of a refrigerator.
Figure 4:
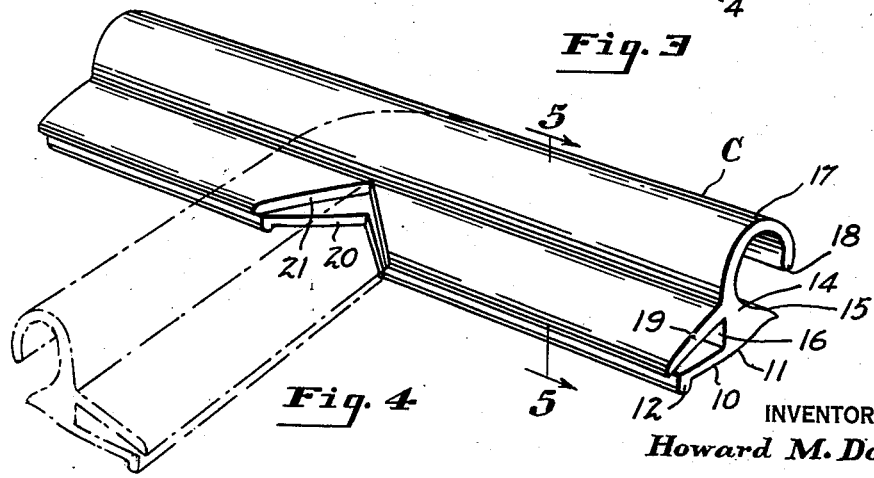
Fig. 4 is a perspective view of the sealing strip showing the miter notches in a portion of the strip which is bent to a small radius of curvature.

Since the cushioning portion of the sealing strip is disposed outwardly of the notches 20 and 21, and since the strip is formed of elastic rubber, the cushioning portion of the strip can be bent around the corner portion of the retaining structure. The bending of the cushioning strip around the corner of the retaining structure creates a slight distortion of the striker bead 17 at the corner, as shown in Fig. 1, but this portion of the striker bead is readily pressed into substantially the same form as the remainder of the striker bead when the door is swung to the closed position shown in Fig. 3, providing a seal that continues around the corner portions and maintaining substantially the same pressure between the striker bead and the face 2 of the refrigerator body at the corners, as in the straight portions of the sealing strip.

It is to be understood that variations and modifications of the specific devices herein shown and described for purposes of illustration, may be made without departing from the spirit of the invention.

What I claim is:

1. In combination in a refrigerator door structure or the like, the structure including a door having edges, corners and marginal faces extending substantially to the corners and edges, means on the door providing retaining flanges substantially paralleling and spaced from the marginal faces, said flanges having free edges directed toward the edges of the door, and a sealing strip of resilient deformable material having base flange means disposed between the retaining flanges and the marginal faces of the door, the sealing trip including a relatively thick cushioning portion integral with the flange means, the cushioning portion of the strip comprising a hollow flange substantially C-shaped in section having a longitudinal opening along one side, said opening facing toward the adjacent edges of the door, and the sealing strip being bent about the retaining flange means adjacent the corners of the door whereby the hollow flange of the cushioning portion partially collapses inwardly at the bends to effect a relative raising of the bent portion of the strip above the marginal faces of the door.

2. In combination in a refrigerator door structure or the like, the structure including a door having edges, corners and marginal faces extending substantially to the corners and edges, means on the door providing retaining flanges substantially paralleling and spaced from the marginal faces, said flanges having free edges directed toward the edges of the door, and a sealing strip of resilient deformable material having base flange means disposed between the retaining flanges and the marginal faces of the door, the sealing strip including a relatively thick cushioning portion integral with the flange means, the cushioning portion of the strip comprising a hollow flange substantially C-shaped in section having a longitudinal opening along one side, said opening facing toward the adjacent edges of the door, the sealing strip being bent about the retaining flange means adjacent the corners of the door whereby the hollow flange of the cushioning portion partially collapses inwardly at the bends to effect a relative raising of the bent portion of the strip above the marginal faces of the door, and the strip having an integral bracing flange connected to the cushioning portion along the length of the latter and disposed in overlying relation to the retaining flange means.

3. In combination in a refrigerator door structure or the like, the structure including a door having edges, corners and marginal faces extending substantially to the corners and edges, means on the door providing retaining flanges substantially paralleling and spaced from the marginal faces, said flanges having free edges directed toward the edges of the door, and a sealing strip of resilient deformable material having a cushioning portion comprising a hollow flange formed with a longitudinal opening along one side, an integral flange extending from the cushioning portion and received between the retaining flanges and the marginal faces of the door, the longitudinal opening being opposite the integral flange of the strip and facing toward the adjacent edges of the door, and the sealing strip being bent about the retaining flange means adjacent the corners of the door whereby the hollow flange of the cushioning portion partially collapses inwardly at the bends to effect a relative raising of the bent portion of the strip above the marginal faces of the door.

4. A flexible sealing strip of rubber-like material for refrigerator doors and the like, said strip comprising a base flange having inner and outer edges and a seating face on one side thereof, a cushioning flange extending generally transversely from the opposite side of said base flange from said seating face at the outer edge thereof and spaced from the inner edge thereof, said cushioning flange, for a portion of its width adjacent said base flange, having an outer face that recedes inwardly at an acute angle with the seating face of the base flange and having an inner face substantially normal to said seating face, said cushioning flange, over the remainder of its width, curving continuously to the free edge thereof, first outwardly and then inwardly toward, but short of, both said receding face and the plane of said seating face to form a striker bead having an outwardly opening C-shaped configuration, the degree of curvature being such that deflection of said striker bead toward the plane of said seating face will move the free edge of the cushioning flange against the outer receding face thereof.

5. A sealing strip according to claim 4 in which said cushioning flange curves outwardly beyond the outer edge of the base flange before curving inwardly toward said receding face.

6. A flexible sealing strip of rubber-like material for refrigerator doors and the like, said strip comprising a base flange having inner and outer edges and a seating face on one side thereof, a cushioning flange extending generally transversely from the opposite side of said base flange from said seating face at the outer edge thereof and spaced from the inner edge thereof, said cushioning flange, for a portion of its width adjacent said base flange, having an outer face that recedes inwardly at an acute angle with the seating face of the base flange and having an inner face substantially normal to said seating face, said cushioning flange, over the remainder of its width, curving continuously to the free edge thereof, first outwardly and then inwardly toward, but short of, both said receding face and the plane of said seating face to form a striker bead having an outwardly opening C-shaped configuration, the degree of curvature being such that deflection of said striker bead toward the plane of said seating face will move the free edge of the cushioning flange against the outer receding face thereof, and a bracing flange extending generally inwardly from the inner face of said cushioning flange in spaced relation with said base flange so as to define a slot therebetween to receive a mounting flange of a door.

7. A sealing strip according to claim 6 in which said base flange and said bracing flange extend inwardly in converging relation.

8. A sealing strip according to claim 6 in which said cushioning flange curves outwardly beyond the outer edge of the base flange before curving inwardly toward said receding face.

9. A flexible sealing strip of rubber-like material for refrigerator doors and the like, said strip comprising a base flange having inner and outer edges and a seating face on one side thereof, a cushioning flange extending generally transversely from the opposite side of said base flange from said seating face at the outer edge thereof and spaced from the inner edge thereof, said cushioning flange, for a portion of its width adjacent said base flange, having an outer face that recedes inwardly at an acute angle with the seating face of the base flange and having an inner face substantially normal to said seating face, said cushioning flange, over the remainder of its width, curving continuously to the free edge thereof, first outwardly beyond the outer edge of the base flange, and then inwardly toward, but short of, both said receding face and the plane of said seating face to form a striker bead having an outwardly opening C-shaped configuration, the degree of curvature being such that deflection of said striker bead toward the plane of said seating face will move the free edge of the cushioning flange against the outer receding face thereof, and a bracing flange extending generally inwardly from the inner face of said cushioning flange in spaced relation with said base flange so as to define a slot therebetween to receive a mounting flange of a door.

HOWARD M. DODGE.

REFERENCES CITED

The following references are of record in the file of this patent:

UNITED STATES PATENTS

| Number | Name | Date |
|---|---|---|
| 2,091,791 | Newman | Aug. 31, 1937 |
| 2,232,570 | Spraragen | Feb. 18, 1941 |
| 2,294,101 | Tripp | Aug. 25, 1942 |
| 2,406,629 | Petkwitz | Aug. 27, 1946 |
| 2,555,780 | Bright | June 5, 1951 |